(12) United States Patent
Narahari et al.

(10) Patent No.: US 12,483,508 B2
(45) Date of Patent: *Nov. 25, 2025

(54) CLOUD-BASED APPLICATION RECOGNITION TO SUPPORT APPLICATION-AWARE FUNCTIONALITY ON CUSTOMER PREMISES EQUIPMENT

(71) Applicant: AT&T Intellectual Property I, L.P., Atlanta, GA (US)

(72) Inventors: Sridhar Narahari, Milpitas, CA (US); Barry Elia, King George, VA (US); Jeffrey Eiber, Jacksonville, FL (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 251 days.

This patent is subject to a terminal disclaimer.

(21) Appl. No.: 17/933,847

(22) Filed: Sep. 20, 2022

(65) Prior Publication Data

US 2024/0098030 A1 Mar. 21, 2024

(51) Int. Cl.
*H04L 47/2475* (2022.01)
*H04L 43/028* (2022.01)
*H04L 12/66* (2006.01)

(52) U.S. Cl.
CPC ........ *H04L 47/2475* (2013.01); *H04L 43/028* (2013.01); *H04L 12/66* (2013.01)

(58) Field of Classification Search
None
See application file for complete search history.

(56) References Cited

U.S. PATENT DOCUMENTS

| | | | |
|---|---|---|---|
| 2018/0091557 A1* | 3/2018 | Komu | H04L 63/08 |
| 2019/0166013 A1* | 5/2019 | Shaikh | H04L 41/20 |
| 2019/0363979 A1* | 11/2019 | Cui | H04L 63/20 |
| 2020/0106706 A1* | 4/2020 | Mayya | H04L 45/38 |
| 2024/0098004 A1* | 3/2024 | Peng | H04L 47/2425 |

\* cited by examiner

*Primary Examiner* — June Sison

(57) ABSTRACT

An example method for performing application recognition in the cloud to support application-aware functionality on customer premises equipment includes detecting a data flow associated with a customer premises equipment device, identifying an application associated with the data flow, generating a mapping that maps the application to an identifier, and providing the mapping to the customer premises equipment device.

20 Claims, 3 Drawing Sheets

CLOUD-BASED APPLICATION RECOGNITION TO SUPPORT APPLICATION-AWARE FUNCTIONALITY ON CUSTOMER PREMISES EQUIPMENT

The present disclosure relates generally to computer networks, and relates more particularly to devices, non-transitory computer-readable media, and methods for performing application recognition in the cloud to support application-aware functionality on customer premises equipment.

BACKGROUND

Application recognition is the recognition of applications associated with data flows through the inspection of packets belonging to the data flows. Application recognition supports many advanced networking applications that are application-aware, including application steering (or application-aware traffic steering, i.e., routing data flows associated with different applications based on an optimal set of metrics) and firewalling (i.e., implementing policies to monitor and filter incoming and outgoing data flows to minimize exposure to malicious data flows). Application awareness is also vital to ensuring advanced security, optimized user experience, improved customer service, and increased business productivity in software-defined wide area networks (SD-WANs) and other networks that employ application-aware traffic steering. SD-WANs allow an entire WAN to be managed centrally (e.g., in the cloud), even if the enterprise associated with the WAN is distributed over many geographic locations (e.g., as in the case of a business whose employees are working remotely from different locations).

SUMMARY

The present disclosure broadly discloses methods, computer-readable media, and systems for performing application recognition in the cloud to support application aware functionality on customer premises equipment. In one example, a method performed by a processing system includes detecting a data flow associated with a customer premises equipment device, identifying an application associated with the data flow, generating a mapping that maps the application to an identifier, and providing the mapping to the customer premises equipment device.

In another example, a non-transitory computer-readable medium may store instructions which, when executed by a processing system in a communications network, cause the processing system to perform operations. The operations may include detecting a data flow associated with a customer premises equipment device, identifying an application associated with the data flow, generating a mapping that maps the application to an identifier, and providing the mapping to the customer premises equipment device.

In another example, a device may include a processing system including at least one processor and non-transitory computer-readable medium storing instructions which, when executed by the processing system when deployed in a communications network, cause the processing system to perform operations. The operations may include detecting a data flow associated with a customer premises equipment device, identifying an application associated with the data flow, generating a mapping that maps the application to an identifier, and providing the mapping to the customer premises equipment device.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
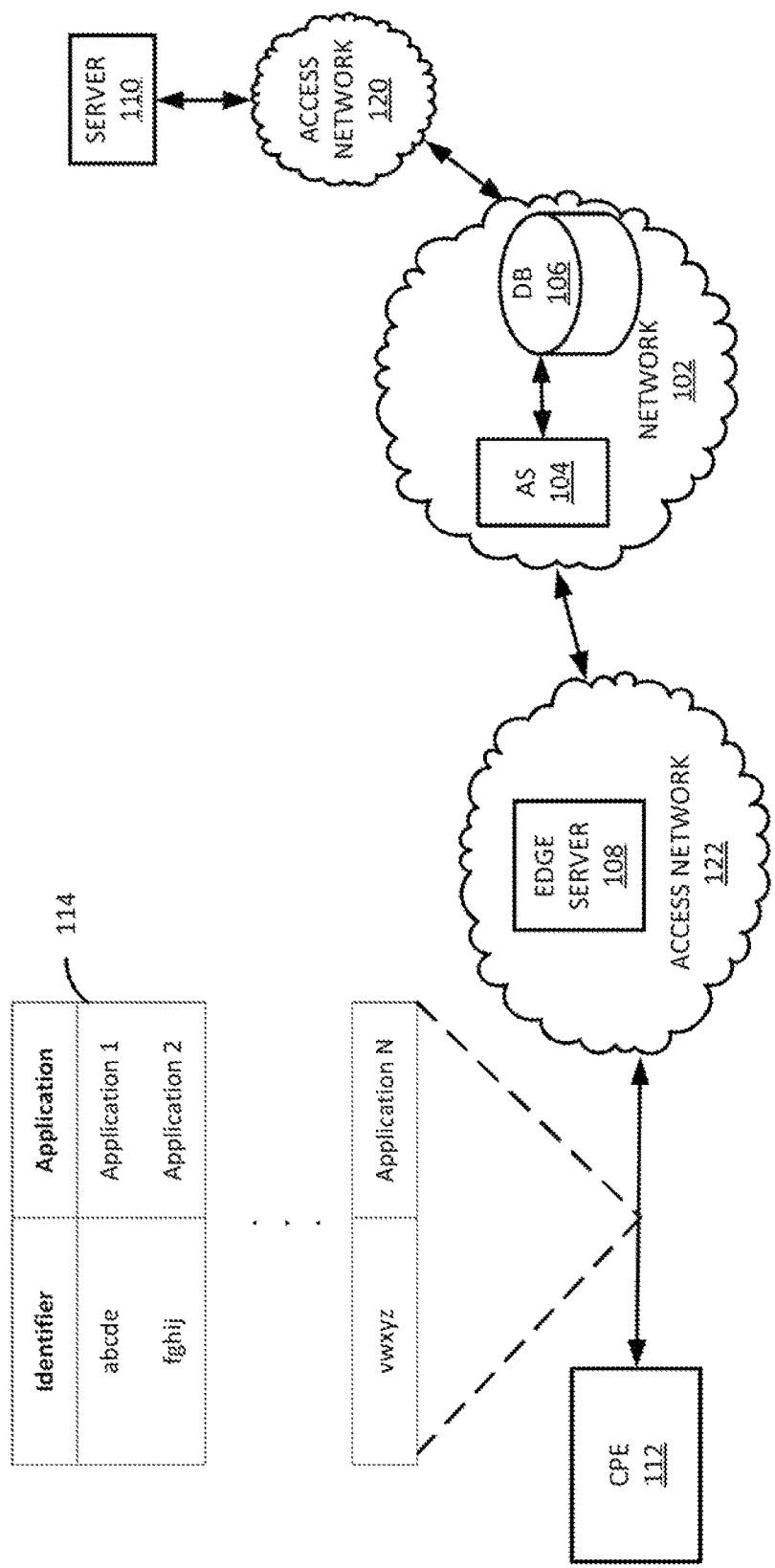
FIG. 1 illustrates an example system in which examples of the present disclosure may operate.

The present disclosure broadly discloses methods, computer-readable media, and systems for performing application recognition in the cloud to support application-aware functionality on customer premises equipment. As discussed above, application recognition is the recognition of applications associated with data flows through the inspection of packets belonging to the data flows. Application recognition supports many advanced networking applications that are application-aware, including application steering (or application-aware traffic steering, i.e., routing data flows associated with different applications based on an optimal set of metrics) and firewalling (i.e., implementing policies to monitor and filter incoming and outgoing data flows to minimize exposure to malicious data flows). Application awareness is also vital to ensuring advanced security, optimized user experience, improved customer service, and increased business productivity in software-defined wide area networks (SD-WANs) and other networks that employ application-aware traffic steering. SD-WANs allow an entire WAN to be managed centrally (e.g., in the cloud), even if the enterprise associated with the WAN is distributed over many geographic locations (e.g., as in the case of a business whose employees are working remotely from different locations).

Application recognition is a resource-intensive function that often must be engineered on a per-device basis. Thus, many devices, including thin customer premises equipment (CPE) devices, may not have the ability to perform application recognition. Thin CPE devices include customer premises equipment such as routers, switches, voice gateways, set top boxes, home networking adapters, and the like, that provide a minimal set of functions and have little to no network function. Thus, most thin CPEs are unable to take full advantage of application-aware functionality. However, there are many scenarios in which thin CPEs and similar devices may benefit from being able to implement flow steering and other advanced functionalities (e.g., in a user's home, while the user is traveling, while the user is shopping, or even in smaller office settings).

Examples of the present disclosure move the application recognition function to the cloud or network edge. In one example, a server may be located in the core network or at the network edge. The server performs application recognition for an application being accessed by a CPE device (e.g., a thin CPE device) and maps the application to an identifier such as a 5-tuple or predefined unique identifier. The mapping of the identifier to the application is then provided to the CPE device, which may, in turn, use the identifier to apply application-aware drive routing logic or other application-aware functionalities on the CPE device. Thus, the server in the core network or the network edge recognizes the application on behalf of the CPE device and provides identifying information to the CPE device. The CPE device may subsequently take advantage of advanced network functions that rely on application recognition. In further examples, the server could be deployed in the central cloud, such that the application recognition function can be provided in the form of standalone software as a service (SaaS).

Although examples of the present disclosure are discussed within the context of CPEs (and thin CPEs in particular), it will be appreciated that the examples disclosed herein are applicable to any system, product, or service that may benefit from application-aware functionality, especially including application steering. These and other features of the present disclosure are discussed in greater detail below in connection with FIGS. 1-4.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, 3 rd party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 4:
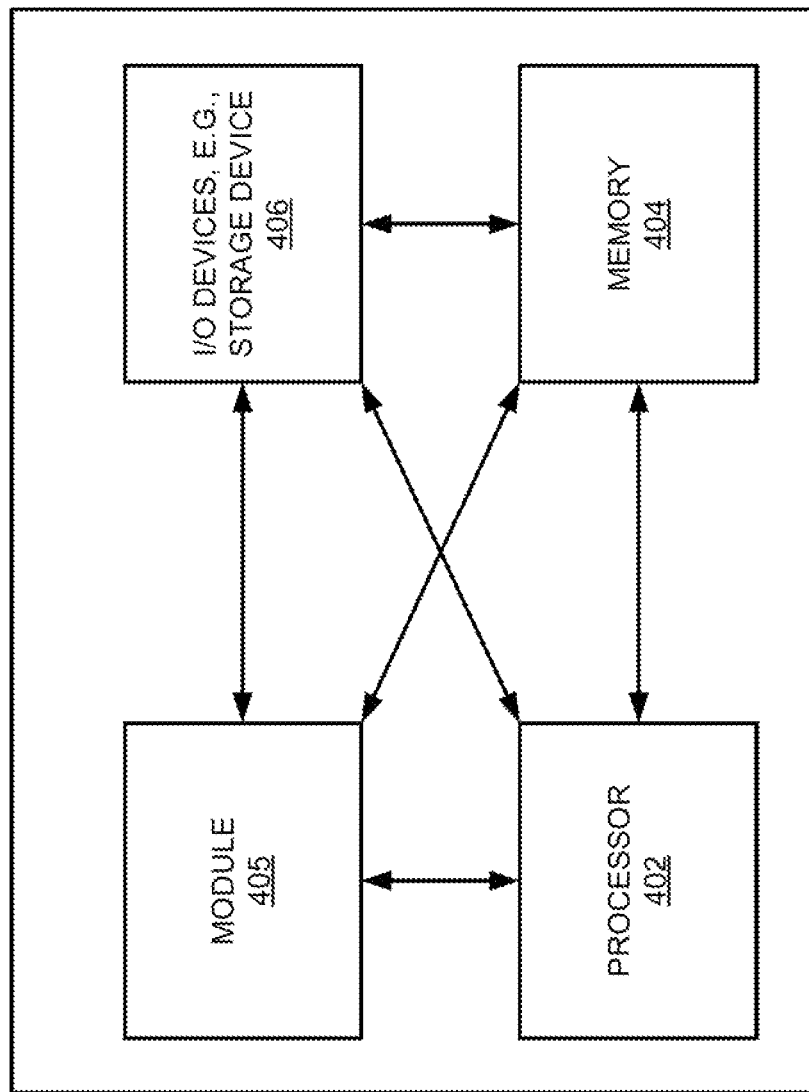
FIG. 4 illustrates an example of a computing device, or computing system, specifically programmed to perform the steps, functions, blocks, and/or operations described herein.

In accordance with the present disclosure, network 102 may include an application server (AS) 104, which may comprise a computing system or server, such as computing system 400 depicted in FIG. 4, and may be configured to provide one or more operations or functions in connection with examples of the present disclosure for performing application recognition in the cloud to support application-aware functionality on customer premises equipment. The network 102 may also include a database (DB) 106 that is communicatively coupled to the AS 104.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure. Thus, although only a single application server (AS) 104 and single database (DB) 106 are illustrated, it should be noted that any number of servers may be deployed, and which may operate in a distributed and/or coordinated manner as a processing system to perform operations in connection with the present disclosure.

In one example, AS 104 may comprise a centralized network-based server for performing application recognition in the cloud to support application-aware functionality on customer premises equipment. For instance, the AS 104 may host an application that detects data flows between a customer premises equipment (CPE) device 112 and network applications which may be hosted by other application servers, server 110, or other devices in the system 100. The AS 104 may identify the applications based on processing of packets of the data flows, and may generate a mapping 114 that maps the applications to identifiers (e.g., 5-tuples, session keys, or other identifiers). In some examples, the mapping 114 may utilize a different name or field in place of the application name, where the different name or field may be derived (partly or fully) using an application ID of the application. For instance, the mapping 114 may comprise a mapping of identifiers (e.g., 5-tuples or session keys) to policies, where a policy may be based on the corresponding application and a user-configured application steering intent or policy (where the user may be a human user, such as an administrator or end user). For instance, a policy may indicate that real-time data traffic should be steered over WAN2/5G. The AS 104 may then provide the mapping 114 to the CPE device 112. Subsequently, the CPE device 112 may utilize the mapping 114 to implement application-aware functions for one or more of the applications.

In one example, AS 104 may comprise a physical storage device (e.g., a database server), to store mappings of applications to identifiers. For instance, the AS 104 may store individual mappings (i.e., mappings of single applications to single identifiers) for a certain period of time, such as until the data flows or sessions associated with the mappings end. In another example, the DB 106 may store the mapping 114, and the AS 104 may retrieve the mapping 114 from the DB 106 when needed. In yet another example, the AS 104 may be stateless and store no mappings. In this case, the AS 104 may simply return a mapping 114 for any data flow that the AS 104 receives from the CPE device 112, without storing the mapping 114. The CPE device 112 may then store the mapping 114 locally (and discard the mapping 114 once the corresponding data flow is terminated). However, the CPE device 112 could also code in routing/steering rules for specific data flows without storing the mappings corresponding to the data flows. For ease of illustration, various additional elements of network 102 are omitted from FIG. 1.

Figure 2:
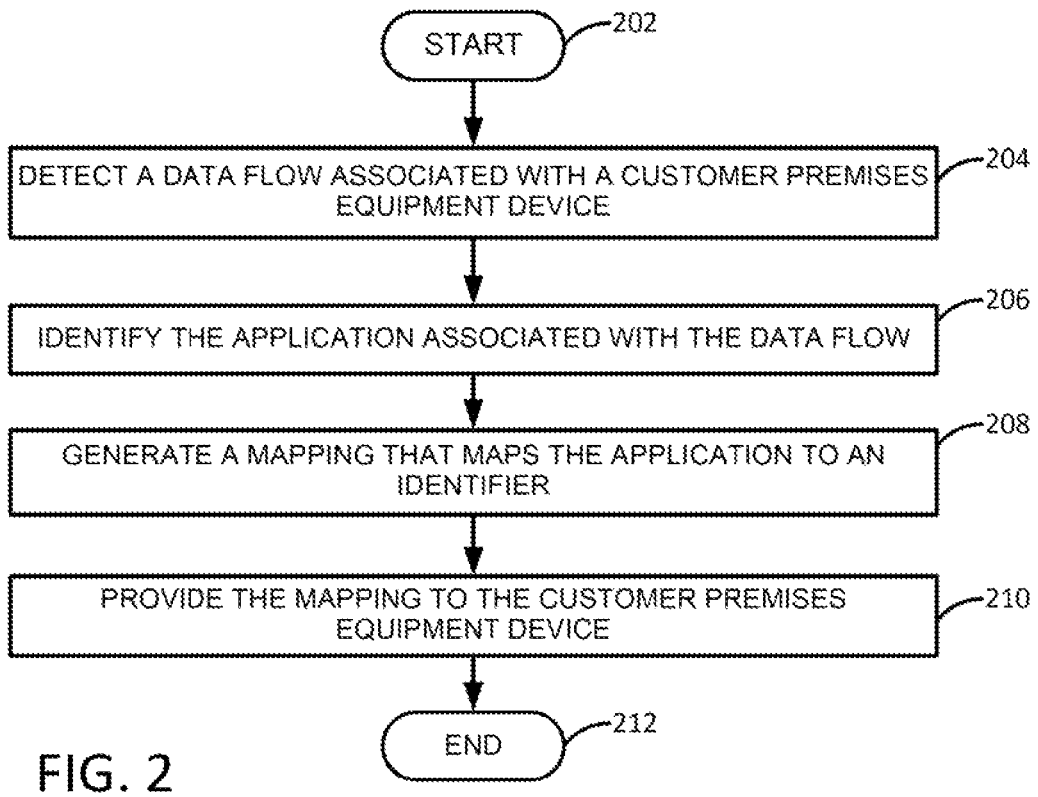
FIG. 2 illustrates a flowchart of an example method for performing application recognition in the cloud to support application-aware functionality on customer premises equipment, in accordance with the present disclosure.

In one example, access network 122 may include an edge server 108, which may comprise a computing system or server, such as computing system 400 depicted in FIG. 4, and may be configured to provide one or more operations or functions for performing application recognition in the cloud to support application-aware functionality on customer premises equipment, as described herein. For instance, an example method 200 for performing application recognition in the cloud to support application-aware functionality on customer premises equipment is illustrated in FIG. 2 and described in greater detail below.

In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components. Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, or the like.

In one example, the access network 120 may be in communication with a server 110. Similarly, access network 122 may be in communication with one or more devices, including CPE device 112. Access networks 120 and 122 may transmit and receive communications between server 110, CPE device 112, application server (AS) 104, other components of network 102, devices reachable via the Internet in general, and so forth. In one example, the CPE device 112 may comprise a thin CPE device such as a router, a switches, a voice gateway, a set top box, a home networking adapter, or the like. In other words, the CPE device 112 may provide a minimal set of functions and have little to no network function, and more specifically may not have access to the resources needed to perform application recognition on its own. In one example, the CPE device 112 may comprise a computing system or device, such as computing system 400 depicted in FIG. 4, and may be configured to provide one or more operations or functions in connection with examples of the present disclosure for performing application recognition in the cloud to support application-aware functionality on customer premises equipment.

In one example, server 110 may comprise a network-based server for performing application recognition in the cloud to support application-aware functionality on customer premises equipment. In this regard, server 110 may comprise the same or similar components as those of AS 104 and may provide the same or similar functions. Thus, any examples described herein with respect to AS 104 may similarly apply to server 110, and vice versa.

In an illustrative example, the AS 104 may support an application to which the CPE device is connected. The edge server 108 may reside in the data path between the CPE device 112 and the AS 104, or may be provided with the first "m" number of packets of the data flow between the CPE device 112 and the AS 104 (e.g., by another device that may mirror the first "m" number of packets). In one example, the access network 122 may comprise a cellular network (e.g., a 4G network and/or an LTE network, or a portion thereof, such as an evolved Uniform Terrestrial Radio Access Network (eUTRAN), an evolved packet core (EPC) network, etc., a 5G network, etc.). Thus, the communications between the CPE device 112 and the edge server 108 may involve cellular communication via one or more base stations (e.g., eNodeBs, gNBs, or the like). However, in another example, the communications may alternatively or additional be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, user endpoint device 112 may communicate with access network 122, network 102, the Internet in general, etc., via a WLAN that interfaces with access network 122. The edge server 108 may perform the functions for performing application recognition in the cloud to support application-aware functionality on customer premises equipment disclosed herein.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. For instance, the CPE device 112 may be capable of performing application-aware traffic steering from one WAN link to another WAN link. The CPE device 112 may also have no more than one WAN link. As an example, the CPE device 112 may have connections to both a wired network and a wireless network. If the CPE device 112 has only a single WAN link, then application-aware firewalling or filtering could still be performed; however steering across WANs would not be possible (since there is only one WAN link). In this case, the application awareness could still facilitate other functions (aside from steering across WANs) that optimize user experience, such as, but not limited to, WiFi optimization, application-aware quality of service (QoS), or Wifi frequency band steering.

In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 110, or may be provided by AS 104 in conjunction with server 110. For instance, AS 104 and server 110 may be configured in a load balancing arrangement, or may be configured to provide for backups or redundancies with respect to each other, and so forth. Thus, these and other modifications are all contemplated within the scope of the present disclosure.

FIG. 2 illustrates a flowchart of an example method 200 for performing application recognition in the cloud to support application-aware functionality on customer premises equipment, in accordance with the present disclosure. In particular, the method 200 describes a process that may be performed by a cloud- or edge-based application recognition service or system. Thus, in one example, steps, functions and/or operations of the method 200 may be performed by a device as illustrated in FIG. 1, e.g., AS 104, edge server 108, or any one or more components thereof. In one example, the steps, functions, or operations of method 200 may be performed by a computing device or system 400, and/or a processing system 402 as described in connection with FIG. 4 below. For instance, the computing device 400 may represent at least a portion of the AS 104 or edge server 108 in accordance with the present disclosure. For illustrative purposes, the method 200 is described in greater detail below in connection with an example performed by a processing system, such as processing system 402.

The method 200 begins in step 202. In step 204, the processing system may detect a data flow associated with a customer premises equipment (CPE) device. In one example, the processing system may comprise a device that is remote from the CPE device (i.e., separate from and not physically connected to the CPE device). For instance, the CPE device may be deployed in a home network, an enterprise network, or another private customer network connected to a larger telecommunications network. The processing system may, on the other hand, be deployed in the cloud, at the edge of the telecommunications network, or elsewhere (e.g., near the customer side, but not on the customer side). As an example, the processing system may reside in the data path between the CPE device and the server or system that supports an application with which the data flow is associated. In this case, the processing system may be tied to a secure access service edge (SASE) or an SD-WAN gateway. In another example, the processing system may not reside in the data path, but may have a view of the data path from the outside (e.g., through mirroring of packets or other methods). In this case, the processing system may not see the entire data flow, but may instead receive the first "m" number of packets of the data flow, where m is a number that is large enough for the processing system to recognize the application.

In one example, the CPE device is a device that is not capable of performing application recognition on its own, and may utilize table-driven routing logic (e.g., based on 5-tuples or destination prefix). Thus, the processing system may have access to greater processing power than the CPE device. For instance, the CPE device may be a thin CPE device, i.e., a device that provides a minimal set of functions and has little to no network function. As an example, thin CPE devices could include customer premises equipment such as routers, switches, voice gateways, set top boxes, home networking adapters, and the like.

In step 206, the processing system may identify the application associated with the data flow.

In one example, one or more of a number of known application recognition techniques could be used to identify the application. For instance, the processing system may identify the application through fingerprinting or deep packet inspection (DPI). In one example, DPI may be performed without hardware assistance. In another example, the processing system may recognize applications without disrupting hardware acceleration. The processing system may utilize any state-of-the-art technique(s) to minimize the computational overhead incurred by performing the DPI.

In step 208, the processing system may generate a mapping that maps the application to an identifier.

In one example, the identifier may comprise a 5-tuple. The 5-tuple may comprise a set of packet header information that is common to all packets of the data flow. For instance, the 5-tuple may comprise a combination of source IP address, destination IP address, source port number, destination port number, and protocol. In another example, the identifier may comprise a session key that is attached to every session associated with the application.

In another example, the mapping may utilize a different name or field in place of the application name, where the different name or field may be derived (partly or fully) using an application ID of the application. For instance, the mapping may comprise a mapping of the identifier (e.g., 5-tuple or predefined unique identifier) to a policy, where the policy may be based on the application and a user-configured application steering intent or policy (where the user may be a human user, such as an administrator or end user). For instance, the policy may indicate that real-time data traffic for the application should be steered over WAN2/5G.

In step 210, the processing system may provide the mapping to the customer premises equipment device.

In one example, the signaling that is used to provide the mapping to the CPE device can be performed using any one or more of a number of remote signaling mechanisms, including, but not limited to, the Google remote procedure call (gRPC) protocol, border gateway protocol (BGP) Flow- Spec (e.g., if the mapping is to be used to implement firewalling), or other protocols.

In one example, the processing system may provide the mapping to the CPE device in real time, i.e., as the mapping is generated. In another example, the processing system may provide the mapping to the CPE device periodically (e.g., once every x seconds) or according to a predefined schedule. In another example, the processing system may provide the mapping to the CPE device in response to the occurrence of a predefined event (e.g., detection of a new data flow associated with the CPE device).

Once the CPE device has the mapping, the CPE device may be able to use the mapping to implement application-aware functionality for the application, such as application steering, firewalling, and other application-aware functionalities that the CPE device might not have otherwise had the capability to implement.

In step 212, the method 200 may end. However, the method 200 may be repeated for additional data flows associated with the CPE device, which may be associated with other applications.

Figure 3:
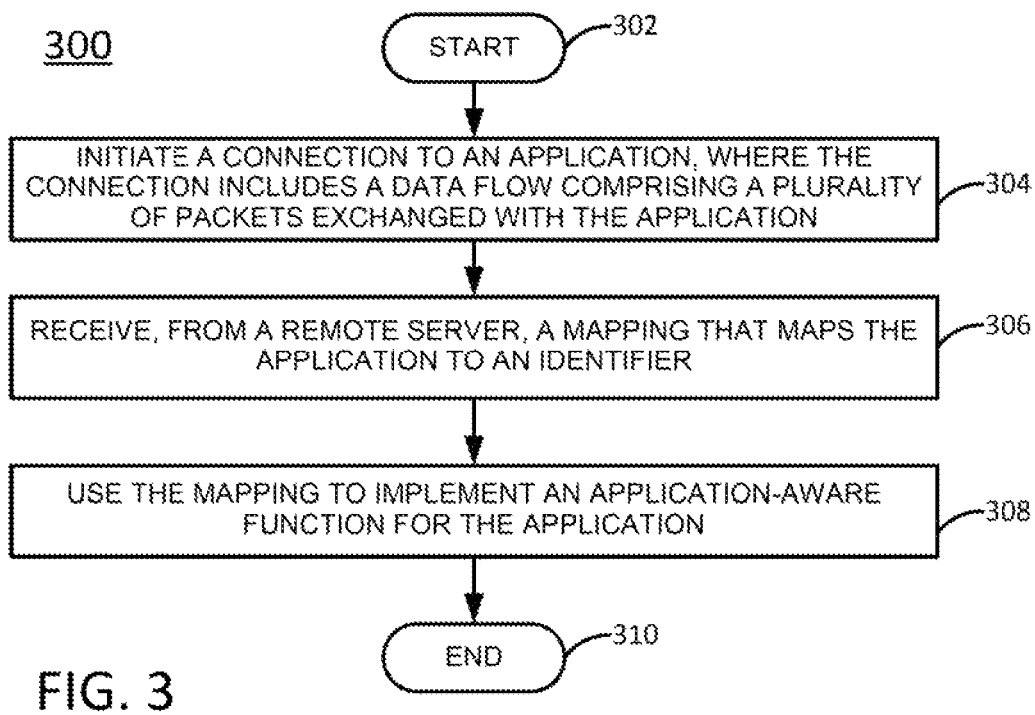
FIG. 3 illustrates a flowchart of an example method for performing application recognition in the cloud to support application-aware functionality on customer premises equipment, in accordance with the present disclosure.

FIG. 3 illustrates a flowchart of an example method 300 for performing application recognition in the cloud to support application-aware functionality on customer premises equipment, in accordance with the present disclosure. In particular, the method 300 describes a process that may be performed by a customer premises equipment device. Thus, in one example, steps, functions and/or operations of the method 300 may be performed by a device as illustrated in FIG. 1, e.g., CPE 112 or any one or more components thereof. In one example, the steps, functions, or operations of method 300 may be performed by a computing device or system 400, and/or a processing system 402 as described in connection with FIG. 4 below. For instance, the computing device 400 may represent at least a portion of the CPE 112 in accordance with the present disclosure. For illustrative purposes, the method 300 is described in greater detail below in connection with an example performed by a processing system, such as processing system 402.

The method 300 begins in step 302. In step 304, the processing system may initiate a connection to an application, where the connection includes a data flow comprising a plurality of packets exchanged with the application (i.e., between the processing system and the application).

In one example, the processing system may comprise part of a device that is not capable of performing application recognition on its own, and may utilize table-driven routing logic (e.g., based on 5-tuples or destination prefix). For instance, the processing system may be part of a CPE device such as a thin CPE device, i.e., a device that provides a minimal set of functions and has little to no network function. As an example, thin CPE devices could include customer premises equipment such as routers, switches, voice gateways, set top boxes, home networking adapters, and the like. As such, the processing system may not "initiate" the data flow in the sense that the processing system is an origination point or an endpoint for the data flow. Instead, in many cases, the processing system (or the CPE device of which the processing system is a part) may route the data flow from a user endpoint device in a customer network, where the user endpoint device is the origination point for the data flow and the processing system is situated in the data path between the user endpoint device and the application.

In one example, the application is supported by an application server that is remote from the processing system, and the connection to the application comprises a connection made over a telecommunications network (where, for instance, the processing system may reside in a home network, an enterprise network, or another private customer network, and the application server may reside in a core network to which devices in the customer network connect via an access network).

In step 306, the processing system may receive, from a remote server, a mapping that maps an identifier to the application.

In one example, the remote server is a computing device that is separate from and not physically connected to the processing system, and that has access to greater processing power than the processing system. For instance, the remote server may be deployed in the cloud, at the edge of the telecommunications network, or elsewhere (e.g., near the customer side, but not on the customer side). As an example, the remote server may reside in the data path between the CPE device and the application server or system that supports the application with which the connection was initiated. In this case, the remote server may be tied to a SASE or an SD-WAN gateway. In another example, the remote server may not reside in the data path, but may have a view of the data path from the outside (e.g., through mirroring of packets or other methods). In this case, the remote server may not see the entire data flow, but may instead receive the first "m" number of packets of the data flow, where "m" is a number that is large enough for the remote server to recognize the application.

In one example, the identifier that is mapped to the application may comprise a 5-tuple. The 5-tuple may comprise a set of packet header information that is common to all packets of the data flow. For instance, the 5-tuple may comprise a combination of source IP address, destination IP address, source port number, destination port number, and protocol. In another example, the identifier may comprise a session key that is attached to every session associated with the application.

In another example, the mapping may utilize a different name or field in place of the application name, where the different name or field may be derived (partly or fully) using an application ID of the application. For instance, the mapping may comprise a mapping of the identifier (e.g., 5-tuple or predefined unique identifier) to a policy, where the policy may be based on the application and a user-configured application steering intent or policy (where the user may be a human user, such as an administrator or end user). For instance, the policy may indicate that real-time data traffic for the application should be steered over WAN2/5G.

In step 308, the processing system may use the mapping to implement an application-aware function for the application.

In one example, the application-aware function may comprise application steering or firewalling. For instance, in one example where the identifier comprises a 5-tuple, the processing system may implement application-aware 5-tuple routing (e.g., using standard routing mechanisms available in Linux). In another example where the identifier comprises a session key, the processing system may implement application-aware session routing, which would require the processing system to create a routing construct based on the session key. The processing system could subsequently add a session key tag to packets pertaining to a corresponding session. It should be appreciated, however, that these routing examples are non-limiting; the mapping provided by the remote server can be easily adapted to work with any routing or steering construct used by the processing system.

In step 310, the method 300 may end.

It should be noted that the method 200 and the method 300 may be expanded to include additional steps or may be modified to include additional operations with respect to the steps outlined above. In addition, although not specifically specified, one or more steps, functions, or operations of the method 200 and the method 300 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIGS. 2 and 3 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Examples of the present disclosure therefore move the application recognition function to the cloud or network edge. In one example, a server located in the core network or at the network edge (and having access to greater processing power than a device that is connected to the application) may recognize the application on behalf of the device and provide identifying information to the device. The device may subsequently take advantage of advanced network functions that rely on application recognition. Thus, examples of the present disclosure may be especially useful in helping thin CPE devices to leverage advanced application-aware functionality.

Moreover, the examples disclosed herein allow application recognition to be performed once for a common server (e.g., a cloud component or a cloud/network edge component), and for the application recognition to then be leveraged across any number of CPE types. Thus, application-aware functionality may be easily provided across a heterogeneous set of devices.

In some examples, the overall system disclosed herein may be coded so that a CPE is provided with identifier-to-application mappings only for a set of predefined applications that is configured by a user (e.g., applications that are relatively important to the user), rather than for all applications to which the CPE connects. For instance, a user may consider a business communication application and a customer relationship management application to be especially important (and therefore to require application-aware functionality), but may consider other applications to which the CPE connects to be less important (and therefore to not require application-aware functionality). Thus, the CPE may only need to store mappings for the set of predefined applications, which is simpler than storing mappings for all applications to which the CPE connects. Moreover, the CPE may, in some examples, discard mappings pertaining to data flows that have expired (e.g., for which the CPE is no longer connected to the corresponding application).

Moreover, in some examples, the methods 200 and 300 may be augmented with network analytics. The network analytics may be generated by software that runs at the network edge, on the CPE device, or on insights derived from a network analytics application programming interface (API). The network analytics would add a performance awareness component to the overall methods described herein, which would enable application awareness to be combined with performance awareness and facilitate decision making that accounts for both application awareness and performance awareness.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for performing application recognition in the cloud to support application-aware functionality on customer premises equipment, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or the method 300 as discussed above is implemented in a distributed or parallel manner for a particular illustrative example, i.e., the steps of the above method 200 or the method 300 or the entire method 200 or method 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200 or method 300. In one example, instructions and data for the present module or process 405 for performing application recognition in the cloud to support application-aware functionality on customer premises equipment (e.g., a software program comprising computer-executable instructions) can be loaded into memory 404 and executed by hardware processor element 402 to implement the steps, functions, or operations as discussed above in connection with the illustrative method 200 or method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for performing application recognition in the cloud to support application-aware functionality on customer premises equipment (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   detecting, by a processing system including at least one processor, a data flow associated with a customer premises equipment device, wherein the customer premises equipment device is a thin customer premises equipment device;
   identifying, by the processing system, an application associated with the data flow;
   generating, by the processing system, a mapping that maps the application to an identifier that identifies the data flow; and
   providing, by the processing system, the mapping to the customer premises equipment device for use by the customer premises equipment device in implementing an application-aware functionality for the application on the customer premises equipment device.

2. The method of claim 1, wherein the customer premises equipment device is separate from and not physically connected to the processing system.

3. The method of claim 2, wherein the processing system resides in a data path between the customer premises equipment device and a server that supports the application.

4. The method of claim 3, wherein the processing system is tied to a secure access service edge.

5. The method of claim 3, wherein the processing system is tied to a software-defined networking wide area network gateway.

6. The method of claim 1, wherein the processing system resides outside of a data path between the customer premises equipment device and a server that supports the application, and wherein the processing system receives a first m number of packets of the data flow.

7. The method of claim 1, wherein the processing system has access to greater processing power than the thin customer premises equipment device.

8. The method of claim 1, wherein the identifying is performed using a fingerprinting technique.

9. The method of claim 1, wherein the identifying is performed using a deep packet inspection technique.

10. The method of claim 1, wherein the identifier comprises a 5-tuple of values extracted from headers of packets of the data flow.

11. The method of claim 10, wherein the 5-tuple of values comprise values for a source internet protocol address, a destination internet protocol address, a source port number, a destination port number, and a protocol.

12. The method of claim 1, wherein the identifier comprises a session key that is attached to each session associated with the application.

13. The method of claim 1, wherein the providing is performed in real time as the mapping is generated.

14. The method of claim 1, wherein the providing is performed periodically.

15. The method of claim 1, wherein the application-aware function comprises at least one of: application steering or firewalling.

16. The method of claim 1, wherein network analytics provide the processing system with insight into a performance of the application, such that the processing system is able to make a decision regarding the application that is both application aware and performance aware.

17. A non-transitory computer-readable medium storing instructions which, when executed by a processing system including at least one processor, cause the processing system to perform operations, the operations comprising:
   detecting a data flow associated with a customer premises equipment device, wherein the customer premises equipment device is a thin customer premises equipment device;
   identifying an application associated with the data flow;
   generating a mapping that maps the application to an identifier that identifies the data flow; and
   providing the mapping to the customer premises equipment device for use by the customer premises equipment device in implementing an application-aware functionality for the application on the customer premises equipment device.

18. A device comprising:
   a processing system including at least one processor; and
   a non-transitory computer-readable medium storing instructions which, when executed by the processing system, cause the processing system to perform operations, the operations comprising:
      detecting a data flow associated with a customer premises equipment device, wherein the customer premises equipment device is a thin customer premises equipment device;
      identifying an application associated with the data flow;
      generating a mapping that maps the application to an identifier that identifies the data flow; and
      providing the mapping to the customer premises equipment device for use by the customer premises equipment device in implementing an application-aware functionality for the application on the customer premises equipment device.

19. The method of claim 1, wherein the application is one of a set of predefined applications configured by a user of the customer premises equipment device, and the processing system only provides mappings to the customer premises equipment device for flows that are mapped to applications included in the set.

20. The method of claim 19, wherein the customer premises equipment device is one of a plurality of heterogeneous customer premises equipment devices, and the processing system provides the mappings to all customer premises equipment devices of the plurality of heterogeneous customer premises equipment devices.

\* \* \* \* \*